W. W. HARRIS.
COMBINED REFUSE VEHICLE COMPARTMENT AND REFUSE RECEPTACLE.
APPLICATION FILED JULY 16, 1915.
1,180,292.
Patented Apr. 25, 1916.
6 SHEETS—SHEET 6.
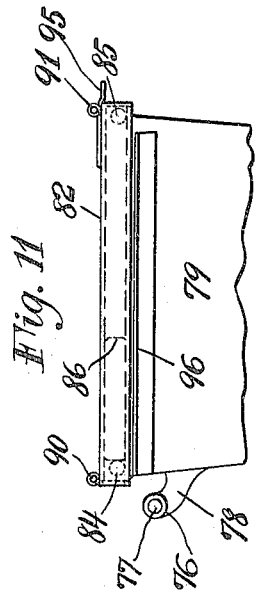
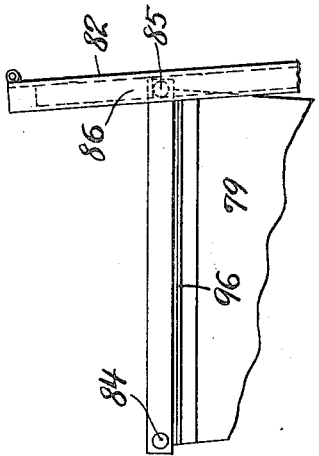
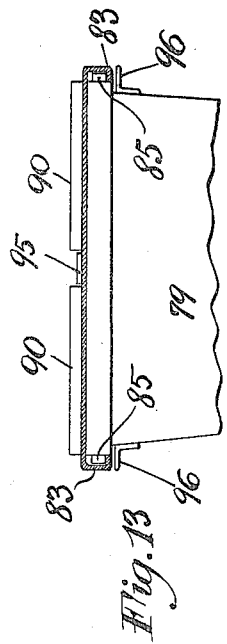
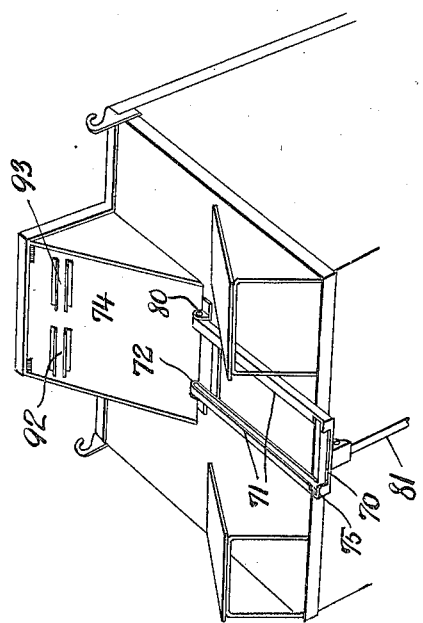
William W. Harris, Inventor
By his Attorneys
Mastick & Lucke

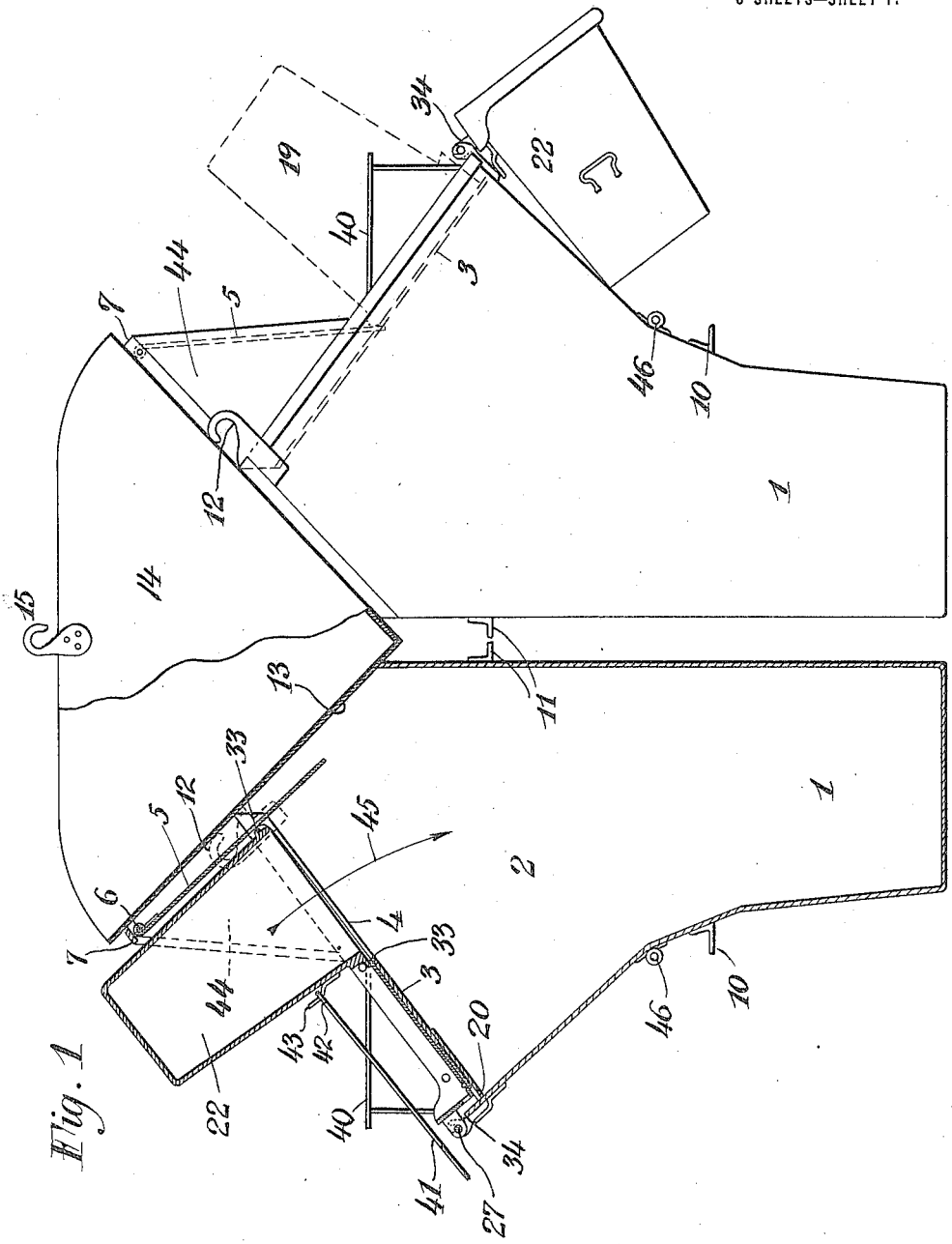

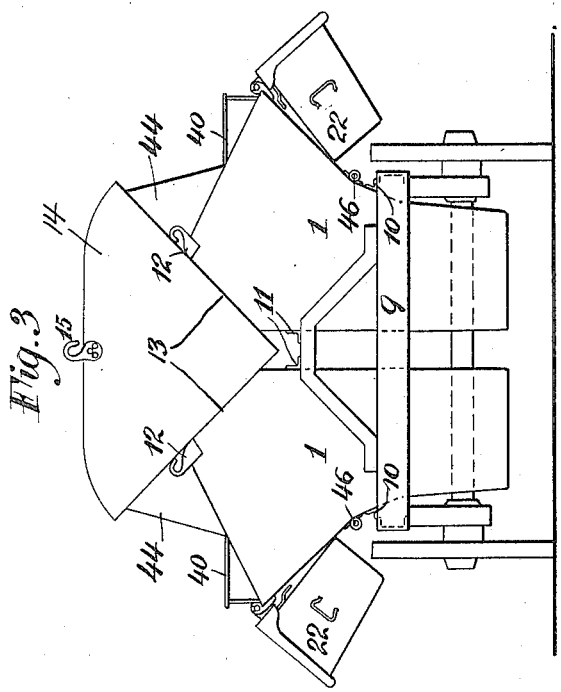
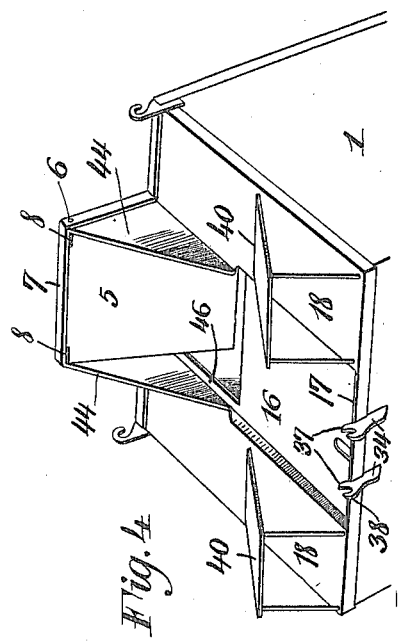
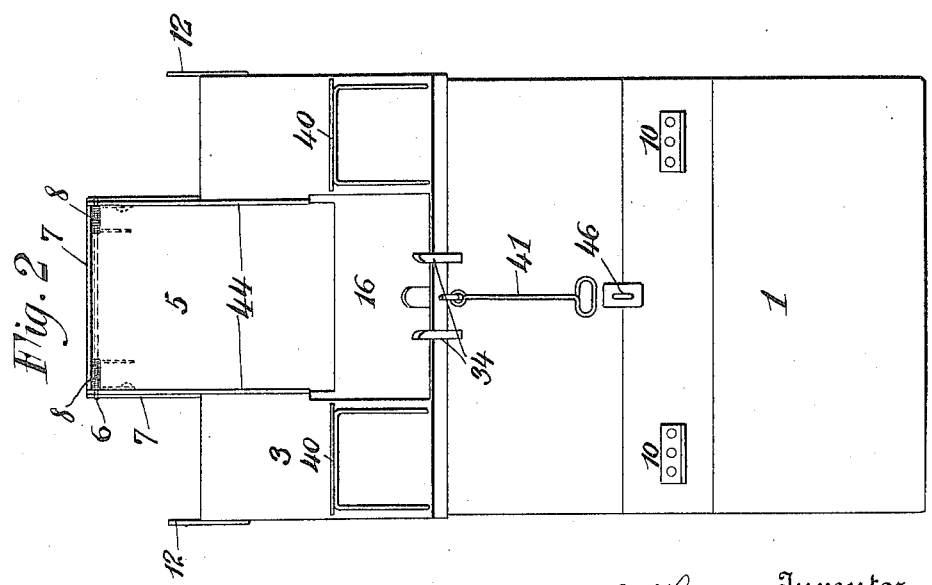

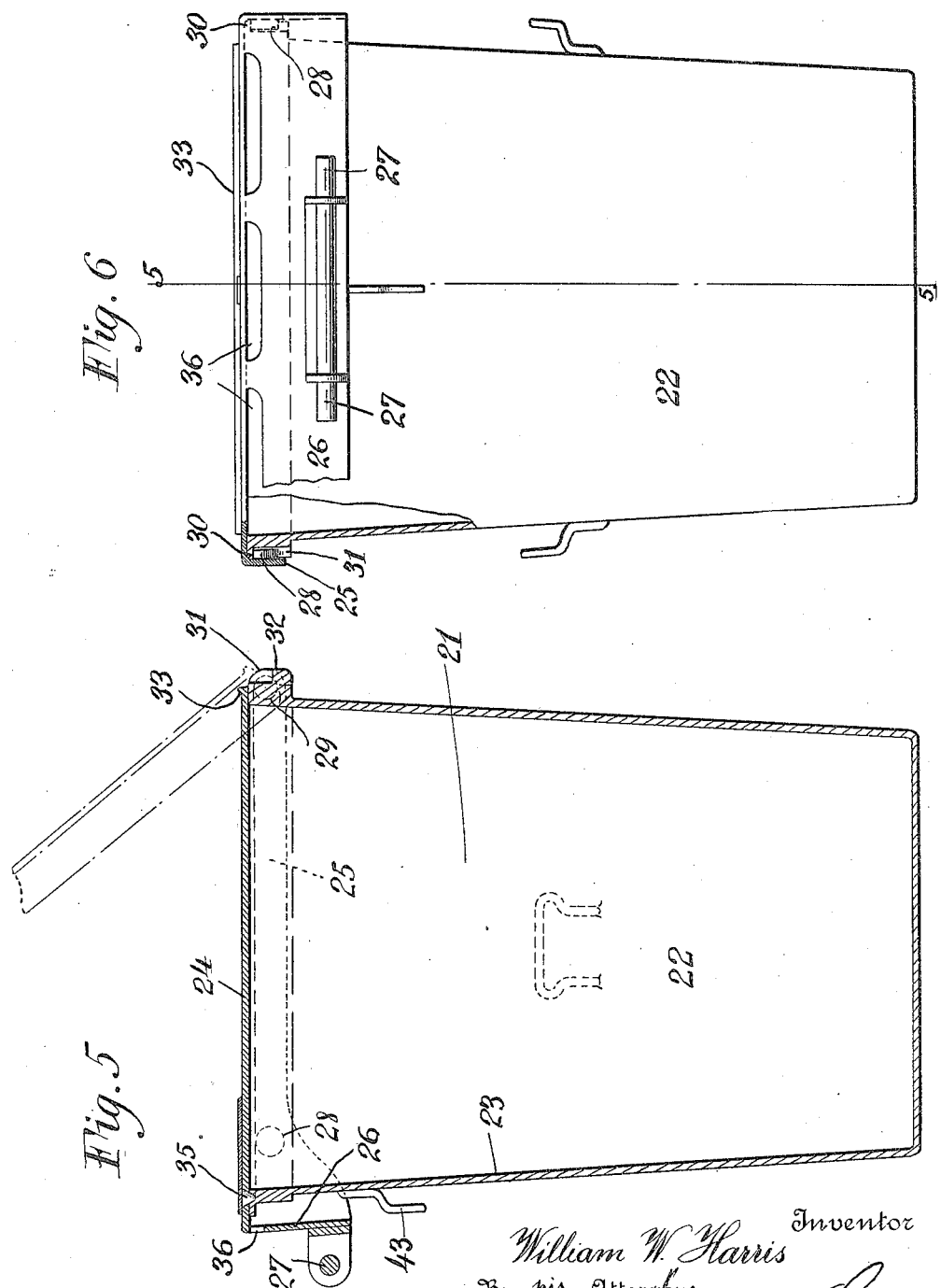

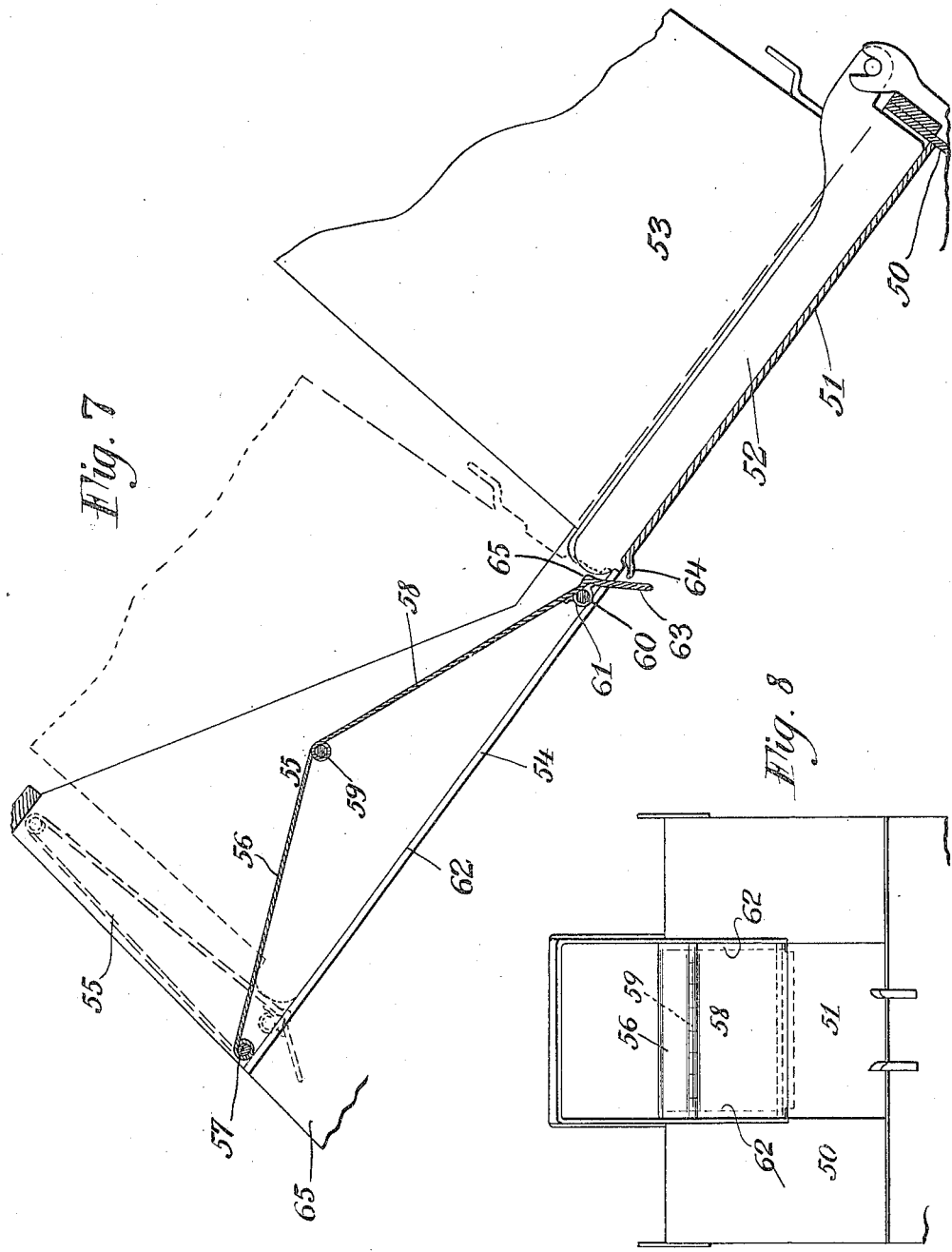

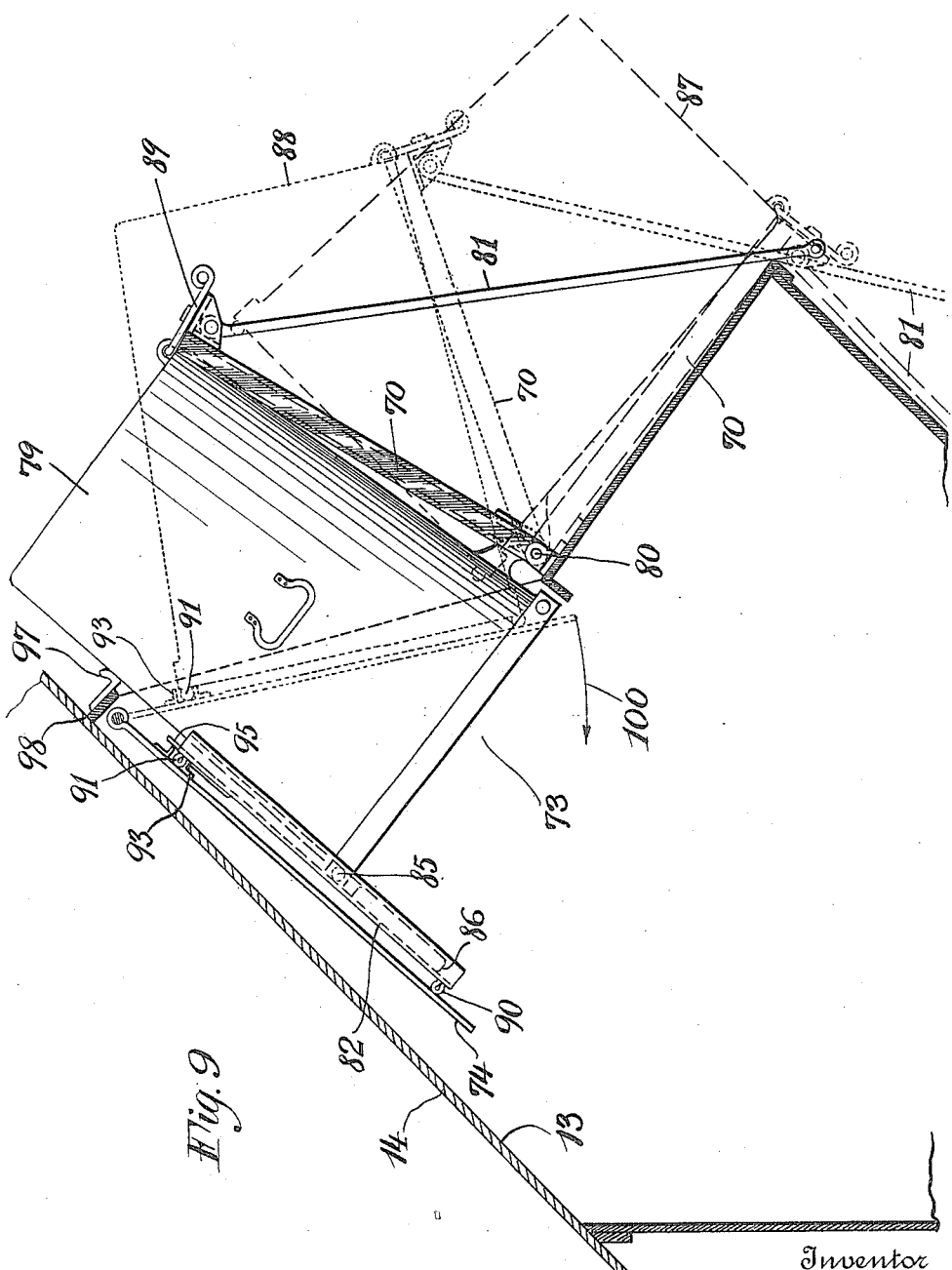

UNITED STATES PATENT OFFICE.

WILLIAM W. HARRIS, OF NEW YORK, N. Y.

COMBINED REFUSE VEHICLE-COMPARTMENT AND REFUSE-RECEPTACLE.

1,180,292.  Specification of Letters Patent.  Patented Apr. 25, 1916.

Application filed July 16, 1915. Serial No. 40,180.

*To all whom it may concern:*

Be it known that I, WILLIAM W. HARRIS, a citizen of the United States, and a resident of the borough of Manhattan, city, county, and State of New York, have invented a certain new and useful Improvement in Combined Refuse Vehicle - Compartments and Refuse-Receptacles, of which the following is a specification.

The invention relates to vehicles or vehicle compartments suitable for receiving and transporting refuse and the like and also to receptacles for storing refuse and the like, constructed in combination with the vehicles or vehicle compartments whereby to insure dustless discharge into the vehicles, the prevention of escape of liquid or fluid matters during discharge, construction of vehicles and receptacles for otherwise attaining absolute sanitary conditions, minimum effort in effecting the discharge, simplicity in construction of vehicles or vehicle compartments and receptacles, etc.

More specifically, the aforesaid and other objects are attained in the form of my invention wherein the body of the vehicle is adapted to carry separate vehicle compartments arranged side by side, and preferably in pairs back-to-back along the length of the vehicle preferably, with the provision of a rubbish tray arranged between the compartments and extending lengthwise of the vehicle. In such form of my invention, each compartment is constructed with an upper portion flaring outwardly with respect to the sides of the body of the vehicle, *i.e.*, the base of each compartment and provided with a charging opening having a yieldable closure means and arranged in combination with the refuse receptacle to preclude escape of dust or other solid as well as liquid matters during the discharge of the receptacles.

More specifically, the charging openings of the vehicle compartments are arranged to insure full charging, and for this object the head of each vehicle compartment is so formed whereby the mean path of discharge from successively emptied receptacles is directed along a predetermined path toward the central portion of each compartment. Accordingly, the pile of refuse thus formed by successive accumulations will be self-distributed uniformly through the interior of the compartment, assisted more or less by the vibrations of the vehicle while being conveyed from one charging point to another. The construction of the charging head of the vehicle compartment attains also the advantage of complete emptying of each receptacle and at the expenditure of minimum physical effort on the part of the operator.

In the preferred forms of my invention, the cover of the vehicle compartment is formed of a depressed portion adapted to receive the cover of a receptacle and openings are provided in such depressed portion to conduct any escaped liquid or other fluid matters into the interior of the vehicle compartment. Similar openings are provided in the cover of the receptacle to allow flow of liquid and other fluid matters therethrough during the operations of inverting the receptacle and moving the receptacle into discharging position.

In the preferred forms of my invention, the mounting means of the cover of the refuse receptacle is constructed to permit relative movement between the cover and the receptacle longitudinally of the cover, as is required during the operation of discharging the receptacle into the vehicle compartment, and also to provide relative movement between the cover and the receptacle transversely of the cover, whereby to effect a hinge relationship between the cover and the body of the receptacle. If desired, the cover of the receptacle may be entirely removed for cleansing and sanitary purposes.

In certain forms of my invention, the vehicle compartment is constructed with suitable means for retaining in fixed position the cover of the receptacle during the operation of discharging, and in certain other forms of my invention, the vehicle compartment is provided with a track along which the refuse receptacle is moved until it reaches a predetermined position, and then the track and receptacle are bodily moved by suitable means accessible to the operator from the ground, to discharging position. In either form of such constructions, the closure of the vehicle compartment may be a door formed of a single element and normally held in closed position by suitable resilient means, or a trap formed of two or more elements adapted to be moved relatively to one another during the operation of discharge of the receptacle through the charging opening.

Other features and objects of my invention will be more fully understood from the following description and accompanying drawings, in which—

Figure 1 is a side elevation, partly in central section, of a pair of vehicle compartments arranged back to back, in accordance with one form of my invention; Fig. 2 is a front elevation of one compartment of the same; Fig. 3 is a rear elevation of a vehicle truck or cart provided with compartments of the aforesaid character; Fig. 4 is a top perspective view of one of said compartments; Fig. 5 is a sectional view on line 5—5 of Fig. 6 of a refuse receptacle constructed to combine with the aforesaid vehicle compartments; Fig. 6 is a front end view partly broken away of the receptacle shown in Fig. 5; Figs. 7 and 8 are respectively a vertical sectional view and front end elevation of a modified form of cover portion and charge opening of the vehicle compartment; Fig. 9 is a vertical sectional elevation of a further modification of cover portion and charging opening of the vehicle compartment, showing also a track for assisting the movement of the receptacle into discharging position and a modified form of cover for the receptacle; Fig. 10 is a front perspective view of Fig. 9; Fig. 11 is a detail side elevation of the receptacle and cover shown in Fig. 9; Fig. 12 is a detail side elevation similar to Fig 11, but showing the cover in open position; and Fig. 13 is a detail end elevation of Fig. 12.

Referring to Figs. 1 to 4 inclusive, each refuse compartment 1 is shown provided with a relatively larger upper portion 2 having the head construction and charging opening arranged for attaining the following results:—(1) effectual removal of all refuse matter out of the receptacle when in dumped position; (2) maximum loading of the vehicle compartment under conditions of successive discharges of refuse receptacles through the same charge opening; and (3) minimum effort on part of operator in effecting the discharge of the receptacles into the vehicle compartment. Preferably, such head construction, as indicated in these figures, comprises locating the discharge opening of the vehicle compartment at the upper rear thereof and of such arrangement as to be closed while on the vehicle body by a rubbish tray or compartment, as more fully set forth hereinafter.

Each head 3 of the vehicle compartment 1 is constructed with a charging opening 4 provided with the movable closure 5 hinged at its end to a suitable support 7 and normally closed under action of gravity assisted by auxiliary means, if desired, such as the coil spring 8, or other resilient means, or by other equivalent means, as will be understood by those skilled in the art. The said compartments 1 may be carried on the vehicle frame or body 9 (Fig. 3) by means of the front lug plates 10 and rear lug plates 11, as in accordance with approved practice.

Each compartment 1 is provided with hooks 12 to permit bodily removal from the vehicle frame 9 as by means of a derrick or crane and to be dumped out through the discharge opening 13, preferably, as by tilting the compartment when elevated by means of the eyes 46. The compartments 1 are arranged on the vehicle body 9 in back-to-back position and the inclined discharge openings 13 are closed by the rubbish compartment 14, shown as of V-shaped construction, and provided with hooks 15 to enable removal by means of derrick or crane.

The head 3 of each vehicle compartment 1 is preferably constructed with the depressed portion 16 combining with outer wall 17 and the lateral head portions 18, 18, to receive the receptacle when in inverted position, as indicated in dotted lines at 19 to the right in Fig. 1. The opening or openings 20 in depressed portion 16 adjacent the wall 17, insures flow of all liquid and other fluid matters into the interior of the compartment 1.

Referring now more particularly to Figs. 5 and 6, the receptacle 21 is shown having a body portion 22 formed of substantially vertical sides 23 and of an upper rectangular cross-section converging at the lower portion into a circular or other cross-section. The cover 24 of receptacle 21 is of similar rectangular cross section and is constructed to be movable relatively to the body 22 of receptacle 21 for the purpose of discharge, also for providing a hinged relationship between cover and body to enable ready opening by the user and also for securing entire removal of cover from the body to enable full access to all portions of the cover and the entire interior of the receptacle for cleansing and sterilizing. In the specific embodiment shown in these figures, the cover 24 is provided at its opposite sides with depending flanges 25, 25, and with the front edge 26 to which the suspending bar 27 is secured; also with the oppositely disposed, forward pair of circular lugs 28, 28, and oppositely disposed rearward pair of circular hinge pins 29, 29. In coöperation with said lugs 28 and pins 29, the body 22 of receptacle 21, is formed with outwardly extending flanges 30, 30, at the opposite sides to permit movement of the cover 24 relative to the body 22. At the rear of said flanges 30, 30, are arranged downwardly curved, outwardly extending flanges 31, 31, and stops 32, 32, whereby after the cover 24 has been moved to clear the lugs 28, 28, of the flanges 30, 30, said cover 24 may be moved upwardly and toward the rear of receptacle 21, until the rear hinge pins 29, 29, engage said rear curved flanges 31, 31 whereupon the cover may be swung upwardly about said hinge pins 29, 29, as a pivot, as indicated in dotted lines in Fig. 5. The flange 32 at the rear end of receptacle 21 co-acts with the enlargement 33 at the rear edge of cover 24 to hold the cover 24 in its limiting opened position. The cover 24 is provided with snap lock 35 or equivalent means to hold the cover in locked position. Openings 36 are provided in the front edge strip 26 for permitting liquid and other fluid matter to flow into openings 20 into the interior of compartment 1, when in inverted position as hereinafter described. The said suspending bar 27 is constructed to be received within the spaced slotted abutments 34, 34, fixed to the vehicle compartment 1, whereby the refuse receptacle may be bodily suspended, preparatory to being swung bottom upwardly to invert the receptacle, cover down, within the depressed head portion 16 of the vehicle compartment 1. It is desirable that the rearward lugs 37 of abutments 34 extend a greater height than the forward lugs 38 to thereby provide a stop for the bar 27 when placing the receptacle 21 into suspended position, and also to taper the inner faces of rearward lugs 37 to facilitate locating the ends of bar 27 within the slots of the abutments 34. After the receptacle 21 has been thus raised into inverted position into the depressed portion 16 of the vehicle compartment 1, the body 22 of receptacle 21 is moved relatively to its cover 24 by manual application of force, for which purpose the stands 40, 40 for the operator are provided at the top of vehicle compartment 1, or by moving the body 22 by means of the push rod 41 having the forward end 42 adapted to engage the lug 43 on body 22 of receptacle 21, as indicated at the left in Fig. 1. Upon such movement of body 22 the enlargement 32 strikes the hinged closure 5 to open the same more and more while the cover 21 is held fixed by retained engagement of bar 27 within the slotted abutments 34.

It will be noted that upon the gradual opening of receptacle 21 into the vehicle compartment 1, whether effected quickly or slowly, the contents of the receptacle are discharged along the general mean path indicated by the arrow 45 directed at a computable angle toward the center of the vehicle compartment and insuring substantially full charging of the compartment upon successive emptying of the receptacles. During such discharge of the receptacle, the edges 30, 30, of the receptacle ride on the oppositely disposed channeled guides 46, 46 (Fig. 4), while the edge 32 of the receptacle is maintained in continuous engagement with the door 5, whereby escape of dust, etc., is precluded continuously during the operation of discharge of the contents of the receptacle into the vehicle compartment. When the receptacle has reached its full discharging position as indicated at the left in Fig. 1, every portion of the interior of body 22 will be brought into full discharging relation with the interior of vehicle compartment 1. When the vehicle compartment has reached nearly full condition, the operator by mounting the stands 40, 40, will be enabled to spread the upper portion of the contents by means of a suitable tool inserted through the charge opening 4. It will be noted that upon moving the vehicle at intervals intermediate charging, the contents will be shaken down in all directions to clear the portion of the interior of receptacle 1 adjacent the charge opening 4.

Referring now to Figs. 7 and 8 the head of the vehicle compartment 50 is provided with the depressed portion 51 into which the cover 52 of receptacle 53 is adapted to be received. The charging opening 54 of the head 50 is closed in this form of my invention, by means of the trap 55 formed of the rear trap element 56 hinged to the fixed pivot 57 and the front trap element 58 pivoted at 59 to the rear trap element 56. At the forward end of trap element 58 is provided the rod 60 carrying at its opposite ends the rollers 61 adapted to ride on the opposite tracks 62. Preferably, the front trap element 58 is provided with the depending apron 63 forming a close fit with the extreme edge 64 of depressed portion 51 when the trap 55 is in closed position. Also, the front trap element 58 is preferably provided with the abutment 65 adapted to be engaged by the rear side edge of the receptacle 53 when the latter is moved into discharging position, similar as aforesaid. However, in this construction, upon movement of the receptacle 53 into discharging position, the trap 55 assumes a more and more collasped or folded position until it attains the extreme folded position indicated in dotted lines. It will be noted that the form of trap 55 comprising relatively movable trap elements attains the advantage of reduced height of the head construction of the vehicle compartment, and hence reduced vertical dimensions of the assembled refuse vehicle. The trap 55 is also advantageous in that it is self-closing under action of gravity upon withdrawal of the receptacle from its full charging position. Such form of trap is also advantageous in that substantially no part thereof projects within the interior of the compartment at any stage of its movement. The vehicle compartment 50 is provided at 65 with an inclined discharge opening, similar to the discharge opening 13 in the construction illustrated in Fig. 1. The cover 52 and receptacle 53 are similar to the corresponding parts illustrated in Figs. 5 and 6.

In the construction shown in Figs. 9 and 10 the track 70 is provided on the top of the head of the vehicle compartment. The track 70 comprises the opposite channeled trackways 71 terminating rearwardly at 72 adjacent the charging opening 73 normally closed by the trap 74. At the forward end of track 70 is provided the entry opening 75 adapted to receive the oppositely disposed rollers 76 and the shaft 77 mounted on the projection 78 carried by the body 79 of the refuse receptacle, as shown in Figs. 11, 12 and 13. Preferably, the track 70 is pivoted at 80 at its rear end, and provided at its forward end with the rod 81, for the purpose hereinafter described. The receptacle 79, in this form, is shown provided with the cover 82 having U-shaped flanges 83 at its opposite sides adapted to embrace the oppositely disposed front lugs 84 and the oppositely disposed rear lugs 85, for the purpose of providing movement of the cover 82 relative to the body 79, and also for providing the hinged relationship of cover 82 to body 79 with the rearward lugs 85, 85, serving as the pivot. The elongated stop 86 is arranged within the U-shaped flange 83, adjacent the forward portion of cover 82, to limit the movement of the cover relatively to the rear lugs 85.

Assuming the receptacle 79 to be raised so that the rollers 77 are positioned within the channeled trackways 71 of track 70, the receptacle and cover move into the tilted position 87, indicated in dash lines, Fig. 9, the combined track 70 and receptacle 79 may be then further tilted upon pushing the rod 81 into the position 88 indicated in dotted lines, and finally into the full dumping position shown in full lines. For such purpose, the push rod 81 is preferably pivotally connected to the track 70, and the lock 89 provided for holding the bottom of receptacle 79 in fixed relation to the track 70.

It will be noted that as the receptacle 79 is moved from the position 87, the forward bead 90 on the top of cover 62 engages the door 74, and as the receptacle 79 is moved into the position 88, the rear bead 91 on the top of cover 82 is caught within the spaced catches 92, 93, carried by the door 74 (see Fig. 10). Upon further movement toward full dumping position, the cover 82 will be gradually swung away in the direction of the arrow 100 from the receptacle 79 and held by the catches 92, 93, onto the door 74 while the lugs 85 move within the U-shaped flange 83, forcing the door 74 and cover 82 into final dumping position, as indicated in full lines. Upon return movement of the receptacle 79 from its full discharging position, the cover 82 will be automatically replaced on top of the receptacle 79 while the door 74 of the vehicle compartment will be brought to closed position, at all stages of which operation a dust proof engagement between the cover 82 and door 74 is continuously maintained. It will also be noted that in this form of my construction the cover 82 of the receptacle never extends below the path of movement of the door 74.

It will be observed that the rollers 76 and the pivot 80 of the track 70 are on the same center, whereby the receptacle may be dumped independently of the track, and preserving the proper relation of the bead 91 and the catches 92, 93.

The rear bead 91 on the cover 82 of receptacle 79 is shown interrupted at its central portion to provide space for the catch 95, to prevent the cover 82 from being pulled off the receptacle 79 in the direction toward the lugs 84. The side flanges 96, 96, on the opposite sides of the receptacle serve to close the lateral clearances when the receptacle 79 is being discharged within the charging opening 74 of the vehicle compartment.

The stop 97 is fixed to the support 98 carried by the vehicle compartment to limit the extreme dumping position of the refuse receptacle.

From the above description, it will be clear that my invention attains simplicity of design, practical construction and durability of refuse receptacles and vehicle compartments, adaptability to local conditions governing the transportation and disposal of refuse, reduced cost of constructing receptacles and vehicle compartments and economy in operating the receptacles to effect discharge into the vehicle compartments.

Whereas I have described my invention by reference to the specific forms thereof, it will be understood that many changes and modifications may be made without departing from my invention.

What I claim and desire to secure by Letters Patent is:—

1. The combination with a compartment having a charging opening, a closure for said opening and means for pivoting said closure to effect movement of same downwardly through said charging opening, of a receptacle, a cover for said receptacle and means for effecting said movement of said closure simultaneously with movement relatively between said receptacle and said cover longitudinally of said cover.

2. The combination with a compartment having a charging opening, a closure for said opening and means fixed to said compartment for pivoting said closure substantially in its own plane, of a receptacle, a cover for said receptacle and means for effecting radial movement of said closure simultaneously with movement relatively between said receptacle and said cover longitudinally of said cover.

3. The combination with a compartment having a charging opening, a closure for said opening and means for pivoting said closure to effect movement of same downwardly through said charging opening, of a receptacle, a cover for said receptacle and means for effecting said movement of said closure simultaneously with movement relatively between said receptacle and said cover longitudinally and transversely of said cover.

4. The combination with a compartment having a charging opening, a closure for said opening and means for pivoting said closure to effect movement of same downwardly through said charging opening, of a receptacle, a cover for said receptacle and means for effecting said movement of said closure simultaneously with movement relatively between said receptacle and said cover longitudinally of said cover, said last named means including studs and guides for said studs disposed on said cover and said receptacle.

5. The combination with a compartment having a charging opening, a closure for said opening and means for pivoting said closure to effect movement of same downwardly through said charging opening, of a receptacle, a cover for said receptacle and means for effecting radial movement of said closure simultaneously with movement relatively between said receptacle and said cover longitudinally of said cover, said last named means including studs disposed on said receptacle and guides for said studs disposed on said cover.

6. The combination with a compartment having a charging opening, a closure for said opening and means for pivoting said closure to effect movement of same through said charging opening, of a receptacle, a cover for said receptacle and means for effecting radial movement of said closure simultaneously with movement relatively between said receptacle and said cover longitudinally and transversely of said cover, said last named means including studs disposed on said receptacle and guides for said studs disposed on said cover.

7. The combination with a compartment having a charging opening, a closure for said opening and means for pivoting said closure to effect movement of same through said charging opening, of a receptacle, a cover for said receptacle and means for effecting radial movement of said closure simultaneously with movement relatively between said receptacle and said cover longitudinally and transversely of said cover, said last named means including a projection on said cover and means on said closure for engaging said projection.

8. The combination with a compartment having a charging opening, a closure for said opening and fixed means for pivoting said closure to effect movement of same downwardly through said charging opening, of a receptacle, a cover for said receptacle and means for effecting radial movement of said closure simultaneously with movement relatively between said receptacle and said cover longitudinally of said cover, said last named means including means disposed on said compartment for revolubly supporting said receptacle.

9. The combination with a compartment having a charging opening, a closure for said opening and fixed means for pivoting said closure to effect movement of same downwardly through said charging opening, of a receptacle, a cover for said receptacle and means for effecting radial movement of said closure simultaneously with movement relatively between said receptacle and said cover longitudinally and transversely of said cover, said last named means including a stud mounted on said receptacle, a guide on said cover for said stud, a lug fixed to said cover and a catch on said closure adapted to receive said lug.

10. The combination with a compartment having a charging opening, a closure for said opening and fixed means for pivoting said closure to effect movement of same downwardly through said charging opening, of a receptacle, a cover for said receptacle, means for mounting said cover onto said receptacle to effect movement relatively between said cover and said receptacle longitudinally of the cover and means for revolubly supporting said receptacle on said compartment.

11. The combination with a compartment having a charging opening, a closure for said opening and fixed means for pivoting said closure to effect movement of same downwardly through said charging opening, of a receptacle, a cover for said receptacle, means for mounting said cover onto said receptacle to effect movement relatively between said cover and said receptacle longitudinally and transversely of the cover and means for revolubly supporting said receptacle on said compartment.

12. The combination with a compartment having a charging opening, a closure for said opening and fixed means for pivoting said closure to effect movement of same downwardly through said charging opening, of a receptacle, a cover for said receptacle, means for mounting said cover onto said receptacle to effect movement relatively between said cover and said receptacle longitudinally and transversely of the cover, said cover mounting means including studs on said receptacle, flanged guides for said studs on said cover and a stop intermediate the ends of said cover, and means for revolubly supporting said receptacle on said compartment.

In testimony whereof I have signed this specification in the presence of two subscribing witnesses.

WILLIAM W. HARRIS.

Witnesses:
K. G. LE ARD,
S. M. BAIDER.